(12) United States Patent
Pan

(10) Patent No.: US 9,200,803 B2
(45) Date of Patent: Dec. 1, 2015

(54) SYSTEM AND METHOD FOR COUPLING COOLANT FLUID CONDUIT TO FEED INJECTOR TIP

(71) Applicant: General Electric Company, Schenectady, NY (US)

(72) Inventor: Edward Pan, Houston, TX (US)

(73) Assignee: General Electric Company, Schenectady, NY (US)

( * ) Notice: Subject to any disclaimer, the term of this patent is extended or adjusted under 35 U.S.C. 154(b) by 536 days.

(21) Appl. No.: 13/684,037

(22) Filed: Nov. 21, 2012

(65) Prior Publication Data

US 2014/0138459 A1     May 22, 2014

(51) Int. Cl.
| | | |
|---|---|---|
| *B05B 1/24* | (2006.01) | |
| *F23D 1/00* | (2006.01) | |
| *B05B 7/06* | (2006.01) | |
| *B05B 7/04* | (2006.01) | |
| *B05B 7/16* | (2006.01) | |
| *B05B 9/00* | (2006.01) | |
| *F02C 3/28* | (2006.01) | |
| *F02M 53/04* | (2006.01) | |
| *F02M 69/04* | (2006.01) | |
| *C10J 3/50* | (2006.01) | |
| *F23D 14/78* | (2006.01) | |

(52) U.S. Cl.
CPC . *F23D 1/005* (2013.01); *B05B 7/04* (2013.01); *B05B 7/06* (2013.01); *B05B 7/16* (2013.01); *B05B 9/002* (2013.01); *C10J 3/506* (2013.01); *F02C 3/28* (2013.01); *F02M 53/043* (2013.01); *F02M 69/04* (2013.01); *F23D 14/78* (2013.01); *F23D 2214/00* (2013.01); *Y02E 20/16* (2013.01); *Y02E 20/18* (2013.01); *Y10T 29/49881* (2015.01)

(58) Field of Classification Search
CPC .............. B05B 7/06; B05B 7/04; B05B 7/16; B05B 9/002; F02C 3/28; F02M 53/043; F02M 69/04; Y02E 20/18; Y02E 20/16; C10J 3/506; F23D 14/78
USPC ................... 239/125, 128, 132–132.5, 397.5, 239/422–424, 428; 110/260, 263, 265; 431/160
See application file for complete search history.

(56) References Cited

U.S. PATENT DOCUMENTS

| | | | | |
|---|---|---|---|---|
| 2,457,304 | A * | 12/1948 | Crowe | 239/132 |
| 2,838,105 | A * | 6/1958 | Eastman et al. | 239/132.3 |
| 5,941,459 | A * | 8/1999 | Brooker et al. | 239/397.5 |
| 2011/0266364 | A1 | 11/2011 | Mishra | |
| 2012/0318887 | A1 | 12/2012 | Pan | |

\* cited by examiner

*Primary Examiner* — Steven J Ganey
(74) *Attorney, Agent, or Firm* — Fletcher Yoder, P.C.

(57) ABSTRACT

A system includes a gasification feed injector that includes a tip portion with a first threaded portion, a coolant chamber disposed in the tip portion, and a coolant fluid conduit having a second threaded portion. The coolant fluid conduit is coupled to the tip portion adjacent to the coolant chamber via screwing of the second threaded portion into the first threaded portion.

16 Claims, 5 Drawing Sheets

SYSTEM AND METHOD FOR COUPLING COOLANT FLUID CONDUIT TO FEED INJECTOR TIP

BACKGROUND OF THE INVENTION

The subject matter disclosed herein relates to feed injectors, and, more particularly, to feed injectors for gasifiers.

A variety of combustion systems employ feed injectors to inject a fuel into a combustion chamber. For example, an integrated gasification combined cycle (IGCC) power plant includes a gasifier with one or more feed injectors. The feed injectors supply a fuel, such as an organic feedstock or a coal slurry, into the gasifier along with oxygen and steam to generate a syngas. In general, combustion or reaction occurs downstream from the feed injectors. However, a flame and/or heat from combustion in close proximity to the feed injectors can reduce the life of the feed injectors, particularly if the feed injectors exceed certain temperatures. For example, the feed injector may be subject to increasingly greater temperatures toward the tip and/or other locations close to the flame. The lives of feed injectors may be reduced by such high temperatures, even when existing cooling techniques are used.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification feed injector that includes a tip portion with a first threaded portion, a coolant chamber disposed in the tip portion, and a coolant fluid conduit having a second threaded portion. The coolant fluid conduit is coupled to the tip portion adjacent to the coolant chamber via threading of the second threaded portion into the first threaded portion.

In a second embodiment, a system includes a reaction chamber. The system also includes a feed injector coupled to the reaction chamber. The feed injector includes a tip portion, a fuel passage configured to inject a fuel through the tip portion, and a coolant fluid conduit coupled laterally to the tip portion via a first threaded connection.

In a third embodiment, a method includes providing a tip portion of a gasification feed injector. The tip portion extends circumferentially around a central axis of the feed injector, and the tip portion has a first threaded portion. The method also includes providing a coolant fluid conduit having a second threaded portion and threading the second threaded portion into the first threaded portion to secure the coolant fluid conduit to the tip portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
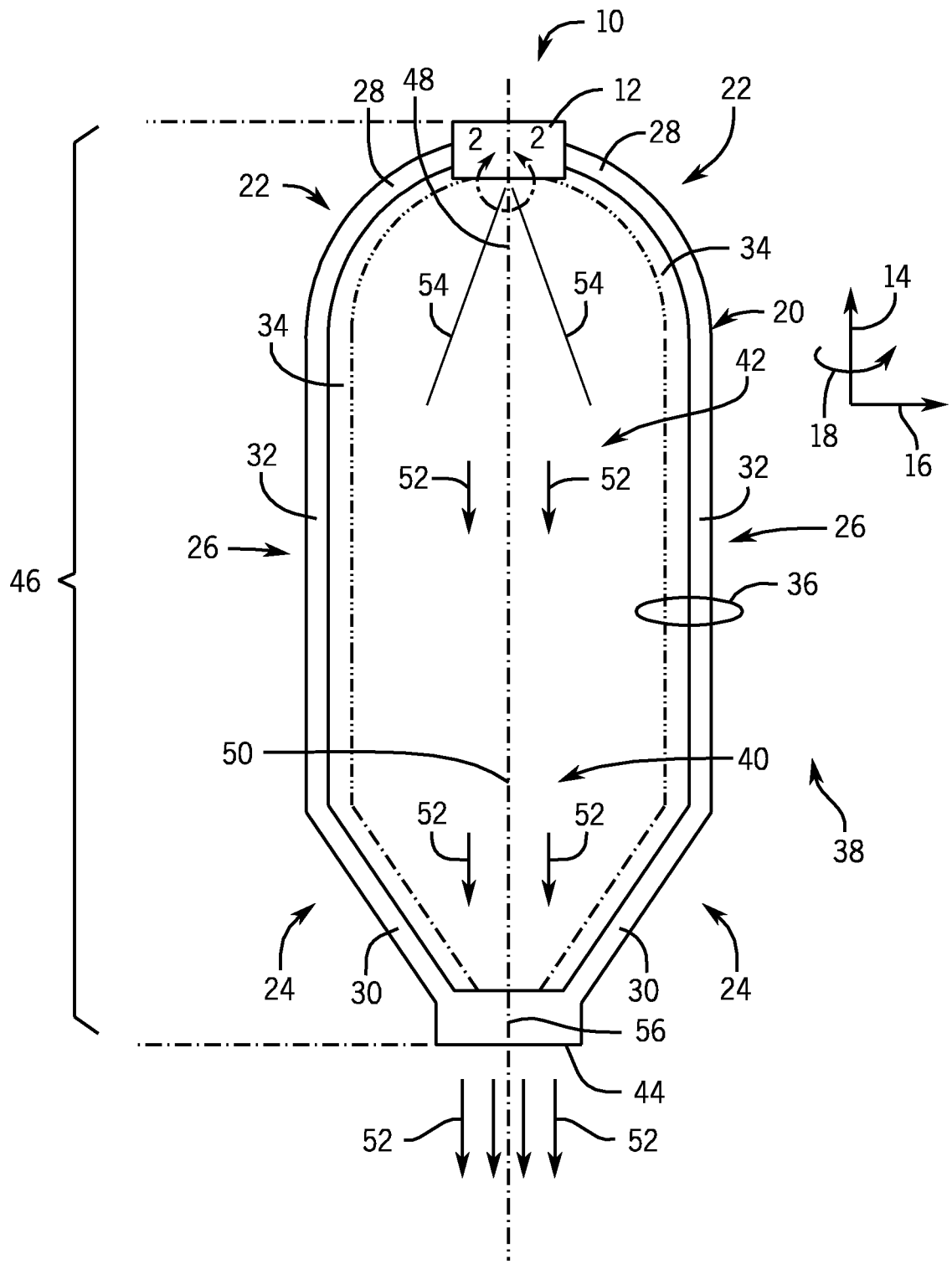
FIG. 1 is an axial cross-section of an embodiment of a gasifier equipped with a feed injector having a coolant chamber.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A combustion system may utilize feed injectors to inject fuel, and optionally other fluids, into a combustion chamber. As used herein, combustion may include partial or complete combustion, gasification, partial oxidation, or other reaction of a feedstock, e.g., a carbonaceous fuel. For example, an integrated gasification combined cycle (IGCC) power plant may have a gasifier that includes one or more gasification feed injectors. Because combustion occurs near a tip of the feed injector, the tip may be exposed to temperatures up to approximately 1,300 degrees Celsius (C.) (2,372 degrees Fahrenheit (F.)). In addition, hot combustion gases may recirculate back toward the feed injector. Such high temperatures may prematurely wear the feed injector even though the injector is made from materials specifically designed for high temperatures. Accordingly, different cooling methods may be used to increase the life of feed injectors. For example, feed injector tips may have an integral coolant chamber to flow a coolant. In addition, a coolant fluid conduit may surround the body of the feed injector to carry coolant to the coolant chamber. Thus, an outer surface of the feed injector may be exposed to hot recirculated gases, while an inner surface of the feed injector may be in contact with the coolant. Exposure to high temperature, temperature fluctuations, and high strain forces may stress the joints between components of the feed injector (e.g., tip connection between tip and coolant fluid conduit). For example, the feed injector may be welded to the coolant fluid conduit at the injector tip, and this welded joint may lead to stress cracks, leakage, and/or failure of the fuel nozzle. In turn, the stress cracks can lead to downtime of the gasifier, thereby causing downtime of chemical production, power generation, or other systems reliant of the syngas.

To address these issues, in various embodiments described below, a gasification feed injector includes a tip portion having a first threaded portion, a coolant chamber disposed in the tip portion, and a coolant conduit having a second threaded portion, such that the coolant fluid conduit is coupled to the tip portion adjacent to the coolant chamber via fastening (e.g. screwing) the second threaded portion into the first threaded portion. In certain embodiments, the gasification feed injector includes a sealant disposed on the first and second threaded portions, which is configured to block a fluid (e.g., water, steam, carbon dioxide, nitrogen, synthetic hydrogen gas, etc.) from leaking through the interface of the threaded portions and out of the gasification feed injector. In some embodiments, this sealant is a high-temperature sealant, such as ceramic cement. The high temperature sealant may withstand the residual thermal stress experienced by the tip portion without cracking better than a conventional welded joint. Furthermore, the first threaded portion is configured to expand toward the second threaded portion in response to heat to block fluid from leaking through the first interface. In this manner, the disclosed embodiments may increase the life of the feed injector, reduce downtime, and increase operational efficiency of the entire plant.

Turning now to the drawings, FIG. 1 is a cross-sectional side view of a gasifier 10 that includes an embodiment of a feed injector 12 (e.g., gasifier feed injector). As discussed below, the feed injector 12 may include a threaded joint between a coolant chamber in a tip of the injector 12 and a coolant conduit 104, thereby enabling separate construction of the feed injector body and conduit, and eliminating the need for a welded joint that can lead to stress cracks and leakage. In further embodiments, the feed injector 12 may be disposed in similar devices, such as, but not limited to, a gas turbine engine, a combustion engine, a combustion system, a boiler, a furnace, a reactor, a combustor, or any combination thereof. As discussed in detail below, various embodiments of the feed injector 12 may include a plurality of internal structures disposed on an internal surface of an annular coolant chamber of the feed injector 12. The gasifier 10 may have an axial axis or direction 14, a radial axis or direction 16, and a circumferential axis or direction 18. The gasifier 10 includes an enclosure 20, also referred to as the shell, that functions as a housing or outer casing for the gasifier 10. The enclosure 20 includes a first end portion 22 and a second end portion 24. An intermediate portion 26 is defined by the section of the enclosure 20 that lies axially between the first end portion 22 and the second end portion 24. The first end portion 22 and the second end portion 24 include a dome-shaped top wall 28, and a triangular-shaped (e.g., conical shaped) bottom wall 30, respectively. A side wall 32 (e.g., annular side wall) parallel to the axis 14 is disposed in the intermediate portion 26 between the top wall 28 and the bottom wall 30.

The illustrated embodiment also includes a thermal barrier 34 concentrically disposed inside the enclosure 20. The thermal barrier 34 and the enclosure 20 form a wall assembly 36 that separates an exterior 38 of the gasifier 10 from an interior 40 of the gasifier 10. The interior 40 includes a gasification chamber 42, or combustion chamber, where pyrolysis, combustion, gasification, or a combination thereof, may occur. The wall assembly 36 is configured to block heat transfer and leakage of gaseous components from the interior 40 to the exterior 38 during gasification. Additionally, the thermal barrier 34 may be configured to maintain the surface temperature of the enclosure 20 within a desired temperature range. Accordingly, the thermal barrier 34 may include passive shielding, active cooling, or a combination thereof. For example, the thermal barrier 34, or refractory insulating lining, may be made of any material that maintains its predetermined physical and chemical characteristics upon exposure to high temperatures.

In the embodiment illustrated in FIG. 1, the feed injector 12 is disposed in the top wall 28 of the first end portion 22 of the enclosure 20. The feed injector 12 is longitudinally offset from an outlet 44 by a distance 46 and includes an injection axis 48 that determines the general orientation of the flow originating from the feed injector 12. The feed injector 12 may be configured to inject fuel, oxygen (e.g., air or any oxygen-containing mixture), cooling gas (e.g., carbon dioxide, nitrogen, or a flame resistant gas), or a mixture of fuel, oxygen, and cooling gas into the gasification chamber 42. For instance, the feed injector 12 may inject fuel in the form of a carbonaceous feedstock, such as coal, petroleum, or biomass. In fact, the feed injector 12 may inject any material suitable for the production of synthetic gas, or syngas, via gasification (e.g., organic materials, such as wood or plastic waste). In certain embodiments, the fuel may be a liquid slurry, such as a coal slurry. In other embodiments, the feed injector 12 may inject a controlled amount of oxygen and/or steam either alone or in combination with a suitable fuel. In specific embodiments, the feed injector 12 may include one or more passages. For example, the feed injector 12 may include one or more fuel passages 74 to inject the fuel and one or more oxygen passages to inject the oxygen.

In the illustrated embodiment, the injection axis 48 is parallel to the axis 14 and perpendicular to the radial axis 16 of the gasifier 10. In other words, the injection axis 48 is parallel to a longitudinal axis 50. Such a feature has the effect of directing a fluid flow emerging from the feed injector 12 in a generally downward direction (e.g., downstream flow direction), as indicated by arrows 52, through the gasification chamber 42 during use. In certain embodiments, the injection axis 48 may be directed away from the longitudinal axis 50 by an angle between approximately 0 to 45, 0 to 30, 0 to 20, or 0 to 10 degrees. Furthermore, certain embodiments of the feed injector 12 may provide a divergent spray, e.g., fluid flow originating from the feed injector 12 may diverge outward toward the side walls 32 in a generally downward direction (e.g., downstream flow direction), as indicated by reference numeral 54.

In the illustrated embodiment of the gasifier 10, the resultant syngas emerges from the gasifier 10 via outlet 44 along a path generally defined by outlet axis 56. That is, the syngas exits the gasifier 10 via a location in the bottom wall 30 of the gasifier 10. However, it should be noted that the gasifier design disclosed herein may be used with a variety of other gasification systems wherein the outlet is not disposed in a bottom wall. For instance, the disclosed embodiments may be used in conjunction with entrained flow gasifiers. In such embodiments, the direction of flow through the gasification chamber 42 may be upward through the gasifier 10, i.e., in a direction opposite arrows 52. In these systems, the resultant syngas may exit an outlet located on or near the top wall 28 of the gasifier 10, while the molten slag may exit through the bottom wall 30. For further example, the disclosed embodiments may be employed in fluidized bed gasifiers. Likewise, the outlet in such devices may be located near the top wall 28 of the gasifier 10 since the direction of flow is generally upward.

Figure 2:
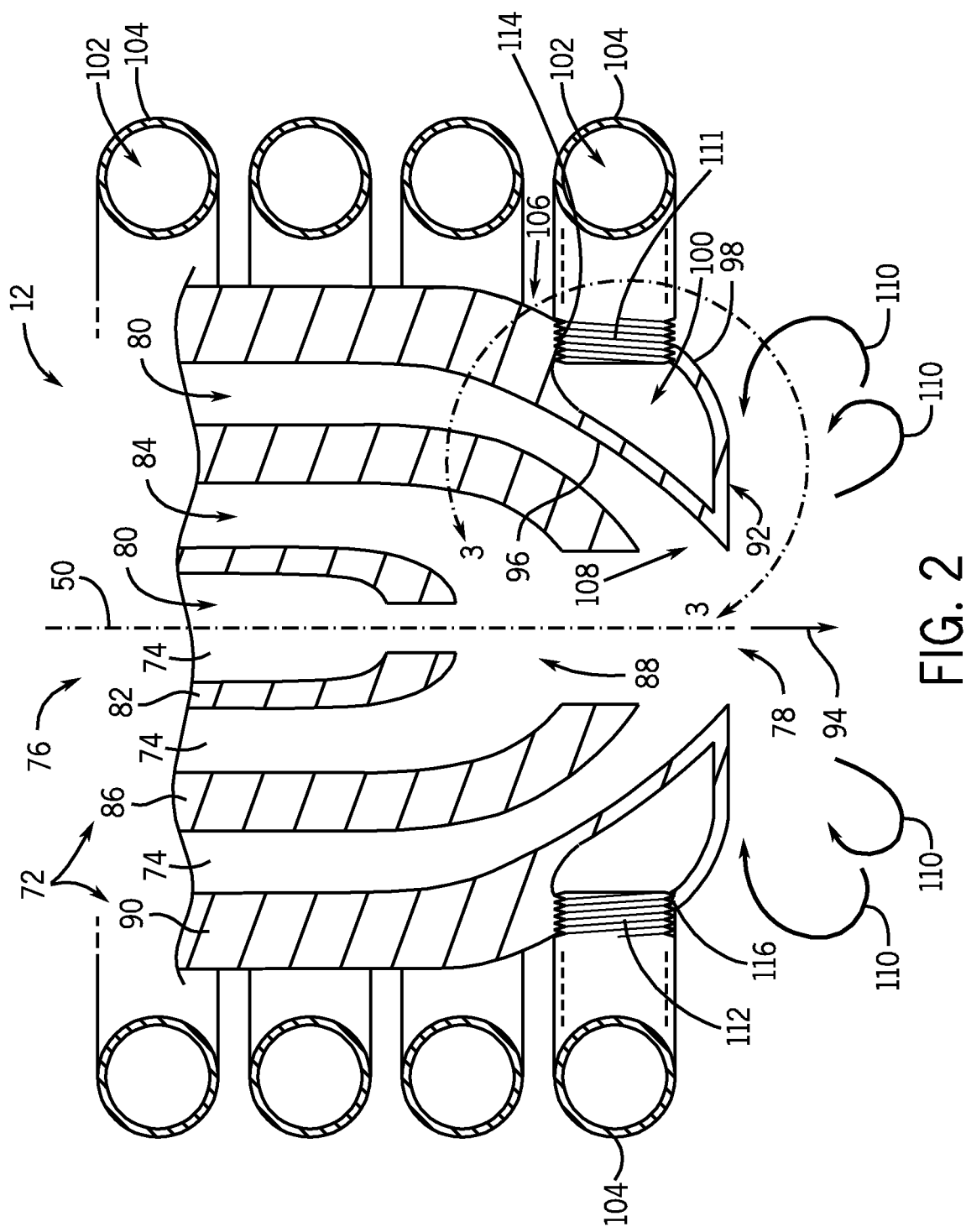
FIG. 2 is a partial axial cross-section of an embodiment of a portion of the feed injector of FIG. 1, taken within line 2-2, having a threaded coolant fluid conduit coupled to the feed injector.

FIG. 2 is an axial cross-section of a portion of the feed injector 12 of FIG. 1, taken within line 2-2, illustrating a plurality of coaxial or concentric conduits 72 defining the fluid. For example, each of the conduits 72 and passages 74 may be generally annular, oval, rectangular, polygonal, or any other shape. A longitudinal axis 50 passes lengthwise through the center of the feed injector 12. The feed injector 12 has an upstream side 76, from which a feedstock, oxygen, and other materials may originate. The feed injector 12 also has a downstream side 78, where the feedstock, oxygen, and other materials may exit. Thus, the downstream side 78 is an outlet for the materials. Turning next to the passages 74 of the feed injector 12, although one arrangement of passages will be described, other arrangements are possible depending on the requirements of a particular combustion system. Specifically, the innermost flow passing through the feed injector 12 is oxygen 80, which is directed to the downstream side 78 by a first oxygen passage 82. The first oxygen passage 82 supplies oxygen 80 for combustion downstream of the feed injector 12. Oxygen 80 may include, but is not limited to, pure oxygen, oxygen mixtures, and air. The next outermost flow is a fuel 84, which is directed to the downstream side 78 by a fuel passage 86. Thus, the fuel passage 86 surrounds the first oxygen passage 82 in a co-axial or concentric arrangement. The fuel 84 may include a dry fuel, a slurry fuel, a liquid fuel, or any combination thereof. The fuel passage 86 directs the fuel 84 downstream of the oxygen 80 from the first oxygen passage 82 to enhance the mixing of the fuel 84 and oxygen 80. The region where the oxygen 80 from the first oxygen passage 82 and the fuel 84 combine may be referred to as pre-mix zone 88. The next outermost flow is oxygen 80, which is directed to the downstream side 78 by a second oxygen passage 90. Thus, the second oxygen passage 90 surrounds the fuel passage 86 in a co-axial or concentric arrangement. The second oxygen passage 90 may direct oxygen 80 to the mixture of the fuel 84 and oxygen 80 from the first oxygen passage 82 to produce a fine spray for efficient combustion. The oxygen 80 from the second oxygen passage 90 may also include, but is not limited to, pure oxygen, oxygen mixtures, and air.

The portion of the oxygen passage 90 adjacent to the downstream side 78 may be referred to as a tip portion 92. Specifically, the tip portion 92 injects the mixture of the fuel 84 and the oxygen 80 in a downstream direction, as indicated by arrow 94. In addition, the tip portion 92 surrounds the other injection passages of the feed injector 12, such as the first oxygen passage 82 and the fuel passage 86. The tip portion 92 includes an inner wall 96 (e.g., inner annular wall) that surrounds the first oxygen passage 82 and the fuel passage 86. The tip portion 92 may also include an outer wall 98 (e.g., outer annular wall) that surrounds the inner wall 96. The tip portion 92 may also include a coolant chamber 100 (e.g., annular coolant chamber) disposed between the inner wall 96 and the outer wall 98. A coolant 102 may be delivered to the coolant chamber 100 via a coolant fluid conduit 104 (e.g. a spiraling conduit). For example, the coolant 102 (e.g., liquid, gas, or combination thereof) may enter the coolant fluid conduit 104 near the upstream side 76 of the feed injector 12. The coolant fluid conduit 104 may be coupled to the coolant chamber 100 in the tip portion 92 via a first threaded connection 114, which is designed to withstand high thermal stress, as discussed in more detail in FIGS. 3 and 4. The coolant 102 then circulates through the coolant fluid conduit 104 until the coolant 102 enters the coolant chamber 100. Examples of coolants 102 include, but are not limited to, water, steam, carbon dioxide, nitrogen, and combinations thereof. Indeed, the coolant 102 may include any suitable coolant gas, coolant liquid, coolant mixture, or any combination thereof. As each of these materials have different heat transfer characteristics, a particular coolant 102 may be selected depending on the particular design considerations of the feed injector 12. As the coolant 102 passes through the coolant chamber 100, the coolant 102 may increase in temperature as the walls (e.g., outer wall 98) are exposed to the hot combustion gases. However, this heat may be removed from the tip portion 92 as the warm coolant 102 exits the coolant chamber 100. Specifically, the coolant 102 may exit the coolant chamber 100 at a location 180 degrees circumferentially apart from the first threaded connection 114. For example, the warm coolant may exit the coolant chamber 100 at a point 180 degrees axially apart from a coolant entrance point 11, at a coolant exit point 112. At the coolant exit point 112, a second threaded connection 116 may couple the coolant chamber 100 to the coolant fluid conduit 104. After exiting, the warm coolant 102 may be passed through a heat exchanger to be cooled and circulated back to the feed injector 12. A refrigerant or air, for example, may be used for cooling in the heat exchanger. By absorbing the heat from the hot combustion gases and carrying it away from the feed injector 12, the coolant chamber 100 may help to protect the feed injector 12 from thermal stress and wear. In addition, the coolant fluid conduit 104, coolant chamber 100, and tip portion 92 may be fabricated from materials specifically designed for high temperatures, such as, but not limited to, austenitic nickel-chromium based superalloys and cobalt-chromium-iron heat resistant alloys.

As shown in FIG. 1, the inner wall 96 and the outer wall 98 extend from a neck 106 (e.g., annular neck) of the feed injector 12 to a rim 108 (e.g., annular rim). The neck 106 may correspond to where the inner wall 96 and the outer wall 98 join together above the coolant chamber 100. The rim 108 may correspond to where the inner wall 96 and the outer wall 98 join together at the downstream side 78. In certain embodiments, the inner wall 96 is an inner annular wall, the outer wall 98 is an outer annular wall, and the outer annular wall 98 is coaxial with the inner annular wall 96. In addition, the coolant chamber 100 may be an annular coolant chamber disposed between the inner wall 96 and outer wall 98, the rim 108 may be an annular rim, and the neck 106 may be an annular neck. However, the feed injector 12 also may have another construction, such as a plurality of passages 74 circumferentially spaced about the axis 50 for each of the illustrated passages 74 (e.g., 80 and 84).

Figure 3:
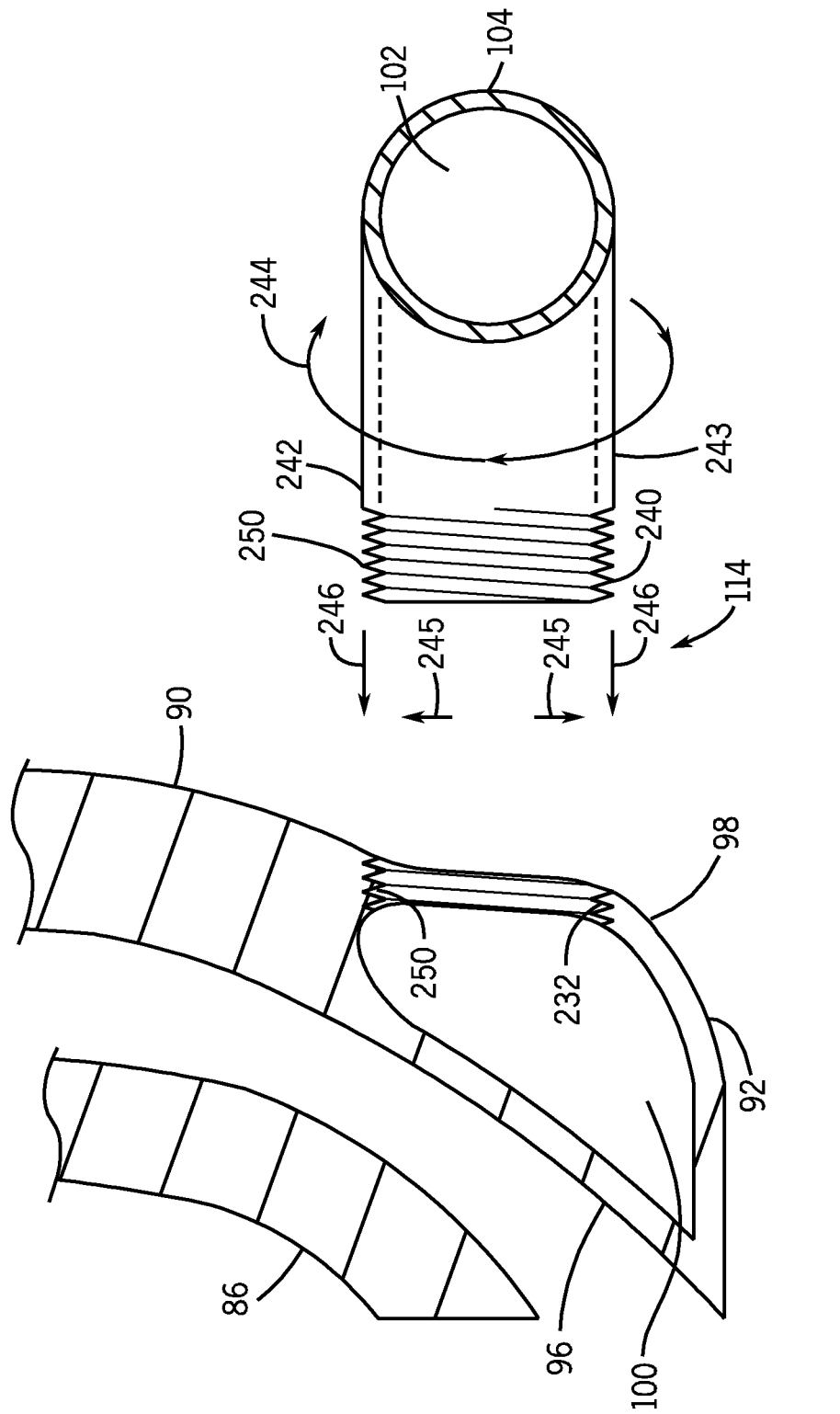
FIG. 3 is a partial axial cross-sectional side view of an embodiment of a feed injector tip of the feed injector of FIG. 2, taken within line 3-3, having the threaded coolant fluid conduit and a threaded feed injector tip.

FIG. 3 is an axial cross-section of the tip portion 92, shown within the line labeled 3-3 in FIG. 2. In the illustrated embodiment, the first threaded connection 114 includes the tip portion 92, which has a first threaded portion 232 (e.g., a female threaded portion or inner annular threaded portion) located in the outer wall 98. A coolant chamber 100 is disposed within the tip 92. The coolant fluid conduit 104 includes a second threaded portion 240 (e.g., a male threaded portion or outer annular threaded portion) located on the outer surface 242 at the end portion 243 of the cooling conduit 104. This embodiment may represent either the first threaded connection 114, where the coolant 102 enters the coolant chamber 100, or the second threaded connection 116, where the coolant 102 exits the coolant chamber 100 (see FIG. 2). The coolant fluid conduit 104, shown here unattached to tip portion 92, is configured to be coupled to the tip portion 92 adjacent the coolant chamber 100 via fastening (e.g., screwing) the second threaded portion 240 into the first threaded portion 232. To screw the coolant fluid conduit 104 to the coolant chamber 100, the coolant fluid conduit 104 is moved toward the coolant chamber 100 in the direction indicated by arrows 246, while being turned in the rotational direction indicated by arrow 244 relative to the coolant chamber 100, until the second threaded portion 240 of the coolant fluid conduit 104 is secured to the first threaded portion 232 on the outer wall 98 of the tip portion 92. Coupling the coolant fluid conduit 104 to the coolant chamber 100 in this way seals the connection between the coolant chamber 100 and the coolant fluid conduit 104, thus blocking leakage of coolant 102 (e.g. fluids such as water, steam, carbon dioxide, syngas, or nitrogen) which may be flowing between the conduit 104 and the chamber 100. A sealant 250, such as a high temperature sealant like ceramic cement, may be applied to an interface 248 of the first threaded portion 232 and the second threaded portion 240 to further seal the connection. In certain embodiments, the sealant 250 may provide resiliency (e.g., a resilient layer) between the threaded portions 232 and 240 to help reduce thermal stress and potential crack formation, while also improving the sealing between the threaded portions 232 and 240. As there may be gaps in between the threaded portions 232 and 240, the sealant 250 may serve as both a sealant and a filler.

FIG. 3 may also represent a second threaded connection 116, which may be arranged on the tip portion 92, approximately 180 degrees circumferentially apart from the first threaded connection 114, as shown in FIG. 2. While the first threaded connection 114 may be located where the refrigerated coolant 102 enters the coolant chamber 100, the second threaded connection 116 may be located where the warmed coolant 102 exits the coolant chamber 100, as shown by coolant exit point 112 in FIG. 2. The second threaded connection 116 has all the elements of the first threaded connection 114. For example, when considering the second threaded connection 116, the first and second threaded portions 232 and 240 as shown in FIG. 3 could be considered third and fourth threaded portions for the second threaded connection 116.

Under thermal stress, such as extremely high temperatures, the end portion 243 of the coolant fluid conduit 104 is configured to expand outward toward the outer wall 98 of the coolant chamber 100 in the tip portion 92, in the direction indicated by arrows 245. This expansion may compress the sealant between the two threaded portions 232 and 240, thereby further blocking fluid leakage across this interface. Both the sealant and the threaded (e.g., 114, 116) connection method are designed to withstand high temperatures, such as temperatures above approximately 537 degrees C. (1,000 degrees F.), and pressure, such as approximately 400 PSI (2,758 kPa), while still maintaining the fluid seal at the interface 248.

Figure 4:
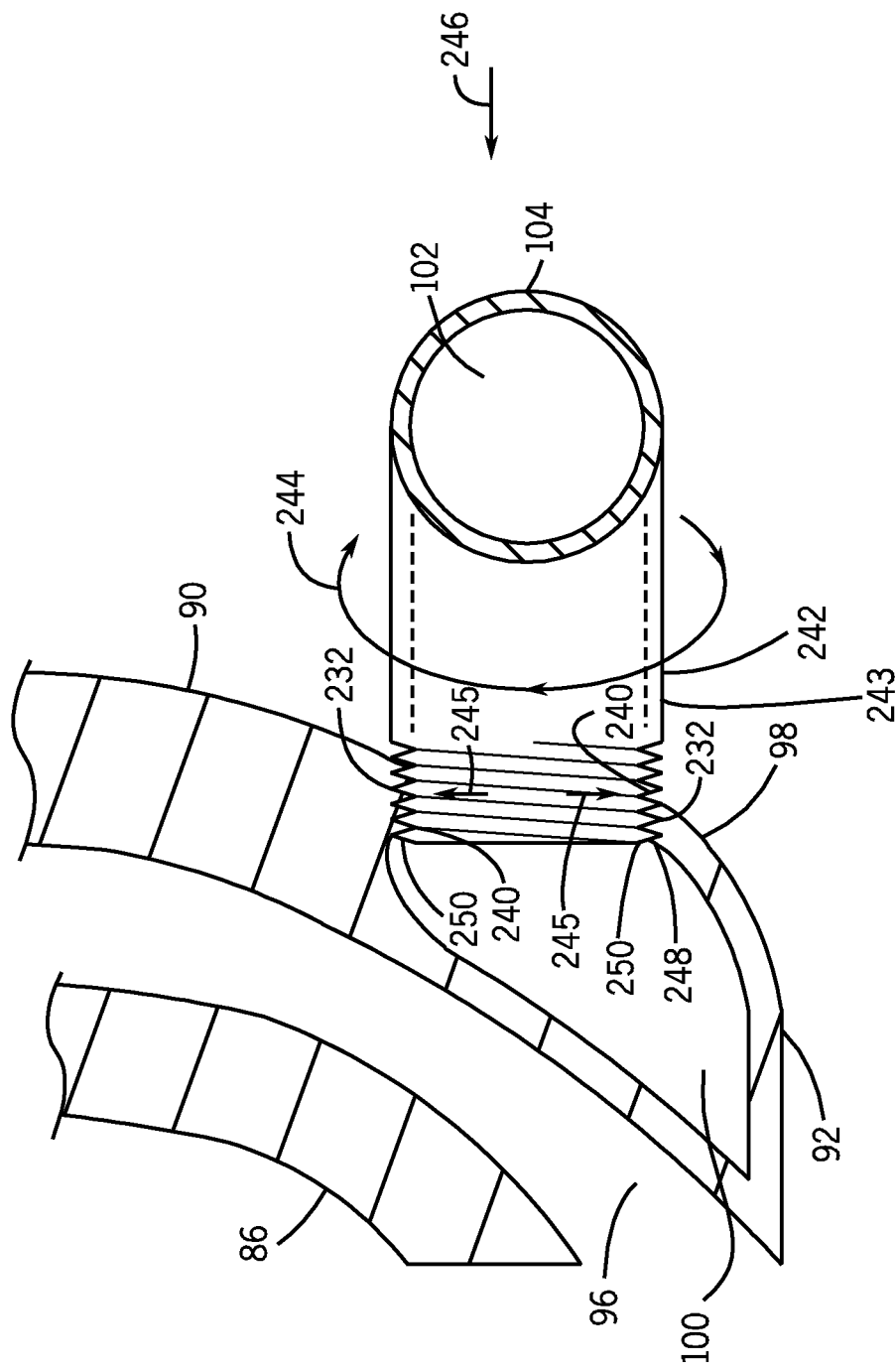
FIG. 4 is a partial axial cross-section of the feed injector tip of FIG. 3, illustrating the threaded coolant fluid conduit coupled to the threaded feed injector tip.

FIG. 4 is an axial cross-section of an embodiment of the tip portion 92, showing the threaded coolant fluid conduit 104 coupled to the coolant chamber 100 in the tip 92. In the illustrated embodiment, the coolant fluid conduit 104 has the threaded portion 240 on the outer surface 242 of the coil conduit 104. The conduit 104 has been rotated in the direction indicated by arrow 244 while moving the conduit 104 in the direction indicated by arrow 246 to couple the conduit 104 to the tip 92. By doing so, the coolant fluid conduit 104 is fastened (e.g. screwed) into the corresponding threaded portion 232 on the tip 92. When exposed to high thermal temperatures, the coolant fluid conduit 104 may expand outward toward the outer wall 98 of the coolant chamber 100 in the tip portion 92, in the direction indicated by arrows 245. This expansion will further compress the first interface 248 of the first and second threaded portions 232 and 240. A high temperature sealant 250 (represented by heavy line), such as ceramic cement may be applied to the first threaded portion 232 and second threaded portion 240, to block a fluid, such as water, steam, carbon dioxide, or nitrogen, from leaking through the first interface 248. Again, the sealant 250 may be a resilient material, a corrosion resistant material, a water resistant material, a chemical resistant material, or any combination thereof. The sealant 250 also may be a compliant interface material having a material composition, coefficient of thermal expansion, hardness, or any combination thereof, which is between the material of the tip portion 92 and the conduit 104. In this manner, the sealant 250 can provide a more gradual transition in one or more properties (e.g., coefficient of thermal expansion, hardness, etc.) from the conduit 104 to the tip portion 92, thereby reducing the possibility of thermal stress and crack formation.

Figure 5:
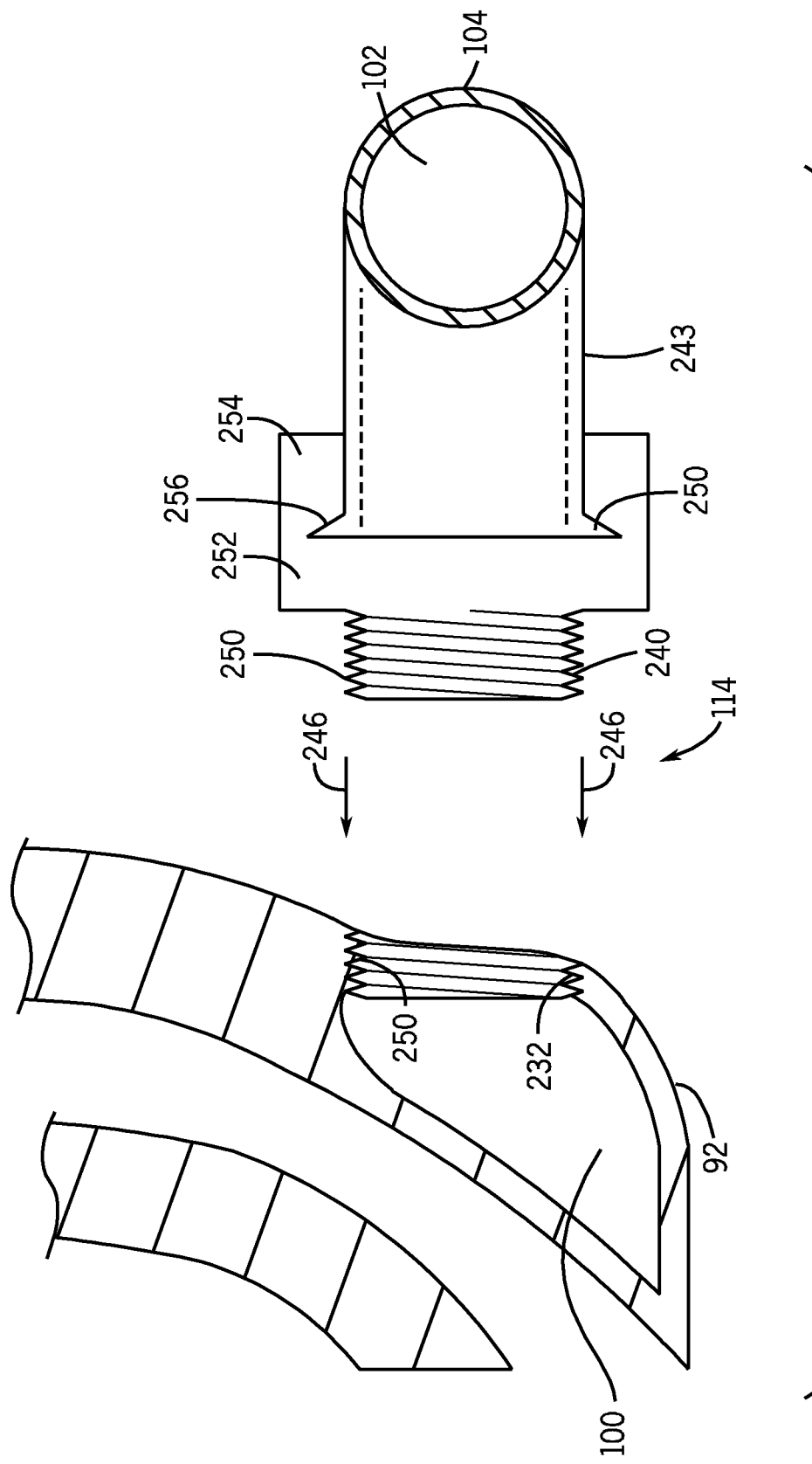
FIG. 5 is a partial axial cross-section of an embodiment of a feed injector tip having a threaded coolant fluid conduit and a flared fitting.

The end portion 243 of the coolant fluid conduit 104 may be coupled (e.g., welded, glued, etc.) to the coolant fluid conduit 104 after the end portion 243 has been secured to the coolant chamber 100 via the first threaded connection 114 (as described in FIGS. 3 and 4). Alternatively, the coolant fluid conduit 104 may be equipped with a fitting such as that shown in the embodiment of FIG. 5, which may allow the end portion 243 of the coolant fluid conduit 104 to rotate while the rest of the coolant fluid conduit 104 remains in place. FIG. 5 shows an embodiment of a feed injector tip (such as that taken within line 3-3 of FIG. 2) having a coolant fluid conduit 104, as in FIGS. 3 and 4, and a flared fitting 252 configured to couple the second threaded portion 250 to the coolant fluid conduit 104. In the embodiment of FIG. 5, the tip portion 243 has a flared tip 250 (e.g., a lip, protrusion, etc.). The flared fitting 252 contains the second threaded portion 240 and has a body 254 that fits over the flared tip 250 of the tip portion 243 of the coolant fluid conduit 104. The inner contour of the body 254 matches the contour of the flared tip 250, such that the flared fitting 252 may be turned to thread the second threaded portion 240 into the first threaded portion 230 while the coolant fluid conduit 104 remains in place. The flared tip 250 ensures that the flared fitting 252 remains coupled to the end portion 243 of the coolant fluid conduit 104.

As the flared fitting 252 rotates to thread the second threaded portion 240 into the first threaded portion 232, the flared fitting 252 moves in the direction indicated by arrows 246, and a compression seal is created at an interface 256 of the flared portion 250 and the body 254 of the flared fitting 252. The coolant fluid conduit 104 may be configured to resist movement toward the coolant chamber 100 so that as the flared fitting 252 moves in the direction indicated by arrows 246 (away from the coolant fluid conduit 104), the interface 256 may become sealed. A sealant, gasket, or another sealing mechanism may be placed at the interface 256 to further block leakage across the interface 256.

As described above, the embodiments of the feed injector 12 with a tip 92 with a threaded coolant fluid conduit 104 that couples to a threaded coolant chamber 100 may have improved resistance to thermal stress compared to other feed injector tips. The threaded connection (e.g., 114, 116) in conjunction with the high temperature sealant 250 (e.g., ceramic cement) may withstand higher temperatures and pressure than alternate attachment methods, such as welding. Increased thermal resistance increases the lifespan of the connection, thereby reducing labor and upkeep requirements, and reducing the cost of maintaining the components of the feed injector 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a gasification feed injector, comprising:
a tip portion having a first threaded portion;
a coolant chamber disposed in the tip portion; and
a coolant fluid conduit having a second threaded portion, wherein the coolant fluid conduit is coupled to the tip portion adjacent the coolant chamber via threading of the second threaded portion into the first threaded portion
wherein the gasification feed injector comprises a sealant disposed on the first and second threaded portions, wherein the sealant is configured to block a fluid from leaking through a first interface of the first and second threaded portions out of the gasification feed injector.

2. The system of claim 1, wherein the sealant comprises a ceramic cement.

3. The system of claim 1, wherein the tip portion has a third threaded portion adjacent the coolant chamber, and the coolant fluid conduit has a fourth threaded portion, wherein the coolant fluid conduit is coupled to the tip portion adjacent the coolant chamber via threading of the fourth threaded portion into the third threaded portion.

4. The system of claim 3, wherein the gasification feed injector comprises the sealant disposed on the third and fourth threaded portions, wherein the sealant is configured to block the fluid from leaking through a second interface of the third and fourth threaded portions out of the gasification feed injector.

5. The system of claim 4, wherein the sealant comprises a ceramic cement.

6. The system of claim 1, wherein the tip portion comprises an inner annular wall and an outer annular wall, and the outer annular wall includes the first threaded portion.

7. The system of claim 1, wherein the first threaded portion is configured to expand towards the second threaded portion in response to heat to block fluid from leaking through the first interface of the first and second threaded portions out of the gasification feed injector.

8. The system of claim 7, wherein the first threaded portion is configured to expand towards the second threaded portion in response to heat to compress the sealant between the first and second threaded portions and to block fluid from leaking through the first interface of the first and second threaded portions out of the gasification feed injector.

9. The system of claim 1, comprising a gasifier having the gasification feed injector.

10. A system comprising:
a reaction chamber; and
a feed injector coupled to the reaction chamber, wherein the feed injector comprises:
a tip portion;
a fuel passage configured to inject a fuel through the tip portion; and
a coolant fluid conduit laterally coupled to the tip portion via a first threaded connection
wherein the tip portion has a first threaded portion and the coolant fluid conduit has a second threaded portion, the second threaded portion is coupled to the first threaded portion in a crosswise direction relative to a central axis of the feed injector to form the first threaded connection, and the tip portion extends circumferentially around the central axis, the first threaded portion extends radially into a side wall of the tip portion, and the second threaded portion is threaded into the first threaded portion.

11. The system of claim 10, wherein the feed injector comprises a sealant disposed within the first threaded connection, wherein the sealant is configured to block fluid from leaking through the first threaded connection out of the feed injector.

12. The system of claim 11, wherein the sealant comprises a ceramic cement.

13. The system of claim 10, wherein the coolant fluid conduit is coupled laterally to the tip portion via a second threaded connection.

14. The system of claim 10, wherein the feed injector comprises a coolant chamber disposed in the tip portion, and the coolant fluid conduit is coupled laterally to the tip portion adjacent the coolant chamber via the first threaded connection.

15. A method comprising:
providing a tip portion of a gasification feed injector, wherein the tip portion extends circumferentially around a central axis of the feed injector, and the tip portion has a first threaded portion;
providing a coolant fluid conduit having a second threaded portion;
threading the second threaded portion into the first threaded portion to secure the coolant fluid conduit to the tip portion; and
applying a sealant to the first threaded portion, the second threaded portion, or both, prior to threading the second threaded portion into the first threaded portion, wherein the sealant is configured to block a fluid from leaking through an interface of the first and second threaded portions.

16. The method of claim 15, wherein the sealant comprises a ceramic cement.

* * * * *